United States Patent
Engel

(10) Patent No.: US 8,013,547 B2
(45) Date of Patent: Sep. 6, 2011

(54) DETECTION AND DELIMITATION OF MAXIMUM STATOR CURRENTS

(75) Inventor: Markus Engel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 437 days.

(21) Appl. No.: 12/300,129

(22) PCT Filed: May 8, 2007

(86) PCT No.: PCT/EP2007/054448

§ 371 (c)(1),
(2), (4) Date: Nov. 10, 2008

(87) PCT Pub. No.: WO2007/131915

PCT Pub. Date: Nov. 22, 2007

(65) Prior Publication Data

US 2009/0115357 A1 May 7, 2009

(30) Foreign Application Priority Data

May 11, 2006 (DE) .......................... 10 2006 023 324

(51) Int. Cl.
*H02K 41/00* (2006.01)
(52) U.S. Cl. .................. 318/135; 318/376; 318/400.26; 310/12.02; 310/12; 361/31; 361/42
(58) Field of Classification Search .................. 318/135, 318/376, 400.26; 361/31, 42; 310/12.02, 310/12; 340/540
See application file for complete search history.

(56) References Cited

U.S. PATENT DOCUMENTS 2,885,568 A 5/1959 Reeder et al.
3,546,531 A 12/1970 Miner
(Continued)

FOREIGN PATENT DOCUMENTS

CH 598708 A5 5/1978
(Continued)

OTHER PUBLICATIONS

Blank et al., "Antrieb und Energieversorgung des Transrapid—Propulsion System and and Power Supply for the Transrapid"—Zevrail—Glasers, Annalen, Georg Siemens Verlag, Berlin, DE, vol. 127, Oct. 2003, pp. 70-82, XP001172194—English abstract.

*Primary Examiner* — Paul Ip
(74) *Attorney, Agent, or Firm* — Laurence A. Greenberg; Werner H. Stemer; Ralph E. Locher

(57) ABSTRACT

A device for driving a magnetic levitation train has at least one controllable power supply unit that feeds at least one multi-phase power supply line, and a long stator with stator windings that extend in switching sections of the long stator. Each switching section can be connected to at least one of the power supply lines via an assigned section feed switch and each stator winding has at least one assigned current sensor for detecting a current and at least one assigned evaluation unit connected to the sensor. In order to permit a simple, precise overcurrent protection, each current sensor is configured to detect the current in one phase of each assigned stator winding and the evaluation unit is configured to deactivate the section feed switch, if the current detected in each case exceeds a previously defined threshold value.

9 Claims, 1 Drawing Sheet

U.S. PATENT DOCUMENTS

| | | | |
|---|---|---|---|
| 6,191,507 B1 * | 2/2001 | Peltier et al. | 310/12.02 |
| 6,320,731 B1 * | 11/2001 | Eaves et al. | 361/42 |
| 6,904,549 B2 | 6/2005 | Jurisch et al. | |
| 7,781,993 B1 * | 8/2010 | Faizullabhoy et al. | 318/135 |
| 2002/0180279 A1 * | 12/2002 | Faizullabhoy et al. | 310/12 |
| 2009/0102647 A1 * | 4/2009 | Engel et al. | 340/540 |
| 2010/0097014 A1 * | 4/2010 | Cruise et al. | 318/135 |
| 2010/0097017 A1 * | 4/2010 | Oteman et al. | 318/376 |
| 2010/0320949 A1 * | 12/2010 | Fotherby | 318/400.26 |

FOREIGN PATENT DOCUMENTS

| | | |
|---|---|---|
| CN | 1405572 A | 3/2003 |
| DE | 101393318 A1 | 2/2003 |
| DE | 10226343 B4 | 3/2005 |
| DE | 10253864 B4 | 4/2005 |

* cited by examiner

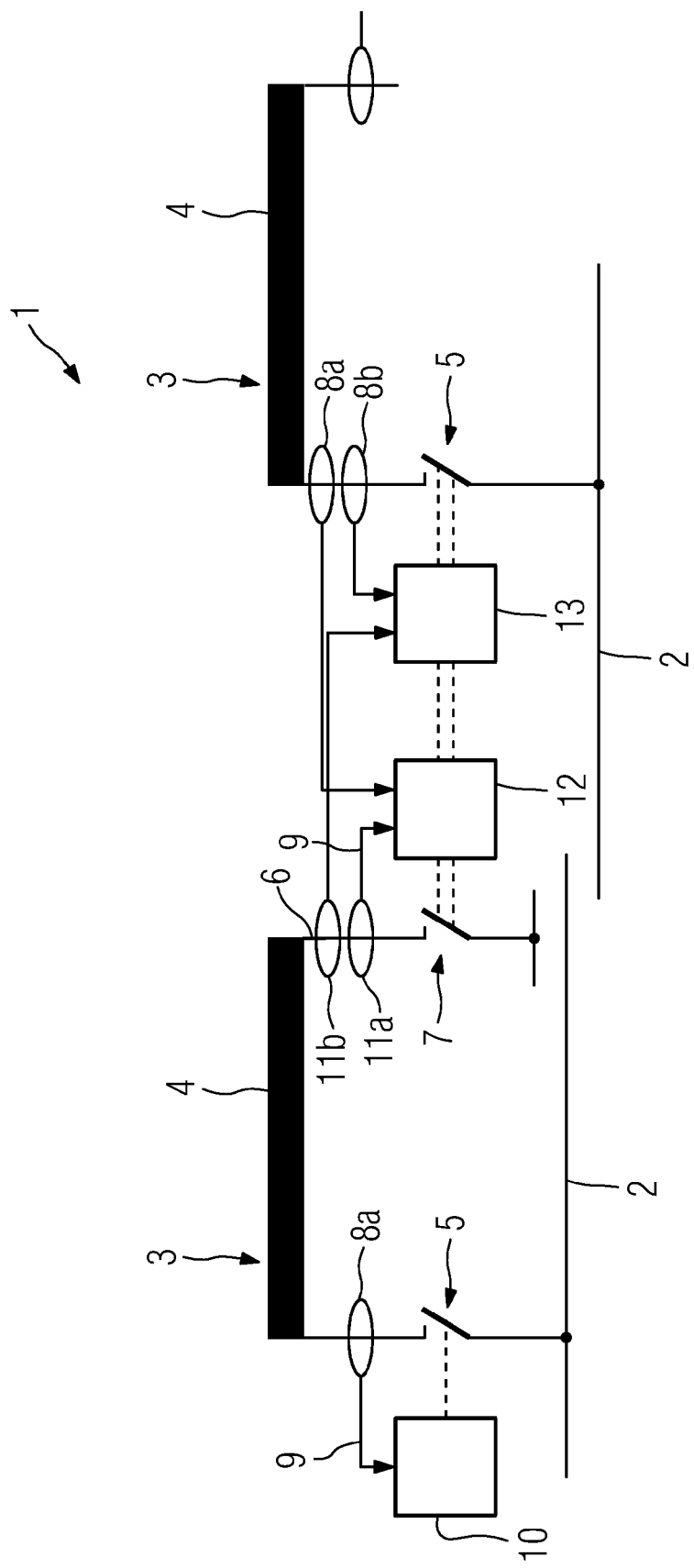

DETECTION AND DELIMITATION OF MAXIMUM STATOR CURRENTS

BACKGROUND OF THE INVENTION

Field of the Invention

The invention relates to an apparatus for driving a magnetic levitation rail road having at least one controllable power supply unit which is designed to feed at least one polyphase power supply line, and having an elongated stator which has stator windings which extend in switching sections of the elongated stator, wherein each switching section can be connected via an associated section feed switch to at least one of the power supply lines, and wherein each stator winding is associated with at least one current sensor for detection of a current, and with at least one evaluation unit which is connected to the current sensor.

An apparatus such as this is already known from the special issue ZEV Glasers Annals, special issue "Transrapid 2003". This special issue describes a magnetic levitation rail road having a drive, with the drive having a linear motor with a stator which extends along the track and is subdivided into switching sections. In order to drive a magnetic levitation rail road, the switching sections can be temporally successively connected to an electrical power supply. The switching sections have associated feed switches for this purpose. The power supply is connected to the associated switching section by switching on the feed switches. Each stator winding is also associated with at least one current sensor for detection of a current, and with an evaluation unit which is connected to the current sensor. Said current detection is designed to detect a ground fault. For this reason, a sum current of all the phase currents of the polyphase power supply line is detected. In the sound state, the sum current is equal to zero because the loads on the phases of the power supply line are balanced. However, in the event of a ground fault, the current distribution is not balanced, resulting in a sum current which is not zero. If the sum current therefore exceeds a configurable threshold value, the evaluation unit trips the associated feed switch, thus disconnecting the power supply from the faulty stator section.

In contrast, according to the prior art, the drive of a magnetic levitation rail road is protected against overcurrents by definition of current limit values for current regulation. The motor controllers and the converter controllers therefore have current threshold values which are associated with different constraints. First of all, the threshold values are dependent on the respectively used converter power class. Furthermore the threshold value is subject to differences resulting from the converter operating mode. In the so-called direct-clock operating mode and the so-called transformer mode, currents of different magnitude are possible, which means that additional threshold values must be defined. Different feed operating modes, for example single feed and double feed, further increase the complexity of overcurrent protection. In general, this therefore results in a relatively confused matrix of threshold values, which are accessed as a function of the type of motor and converter regulation. The complexity of the overcurrent protection results in disadvantageous constellations, such as a relatively long connection route and reduction in the maximum speed of the magnetic levitation rail road that can be used operationally.

BRIEF SUMMARY OF THE INVENTION

The object of the invention is therefore to provide an apparatus of the type mentioned initially which allows both simple and accurate overcurrent protection.

The invention achieves this object in that each current sensor is designed to detect the current in one phase of the respectively associated stator winding, and the evaluation unit is designed to switch off the section feed switch if the respectively detected current exceeds a previously defined threshold value.

According to the invention, the overcurrent is no longer detected in the immediate vicinity of the power supply unit to be controlled. In fact, provision is made for the detection and limiting of the maximum possible drive currents to be installed on each switching section. According to the invention, the current which is flowing in the currently connected switching section is therefore detected directly, with the associated evaluation unit ensuring that, if a threshold value is exceeded, the associated section feed switch is switched off independently of the control of each power supply unit, as a result of which the faulty switching section is decoupled from the power supply. The threshold value can therefore be set closely above the maximum stator current required during operation. Furthermore, the association with the respective switching section allows the capability for position-dependent configuration. The threshold value can therefore be reduced appropriately, for example, in switching sections in which only slight acceleration or deceleration is required during operation.

The current sensors advantageously comprise feed current sensors which are arranged in the immediate vicinity of the section feed switch. The feed current sensors are therefore arranged in the vicinity of the track, that is to say of the stator, of the magnetic levitation rail road. The evaluation unit and section feed switch are therefore installed physically close to one another, and relatively long communication paths have therefore become superfluous.

According to a further expedient refinement of the invention, the current sensors comprise star-point current sensors which are arranged in the immediate vicinity of the star point of the respectively associated stator winding. If feed current sensors are also provided, in addition to the star-point current sensors, and likewise interact with an evaluation unit, this results in redundant overcurrent detection. In this case, by way of example, the evaluation units are connected to one another, with one evaluation unit providing the overall overcurrent protection as a so-called master evaluation unit, during normal operation. The other evaluation unit therefore operates as a so-called slave. If the master evaluation unit becomes faulty, this or a superordinate control level switches over to the slave evaluation unit, which then provides the overcurrent protection.

The apparatus according to the invention advantageously has section star-point switches at the star point of the stator winding. According to this advantageous further development, the switches are also of a redundant design, as a result of which, if one switch fails, the stator winding can be reliably disconnected from the power supply line by the switch which is still intact.

The apparatus according to the invention advantageously has a first evaluation unit which is designed to trip the section feed switch, and a second evaluation unit for tripping the section star-point switch.

The reliability of the overcurrent protection is enhanced even further by the apparatus according to the invention having a second evaluation unit which is designed to trip the section feed switch of a subsequent switching section.

The apparatus according to the invention expediently has a first evaluation unit of a subsequent switching section, which is designed to trip the section star-point switch of the preceding switching section. This further development also increases the reliability of the overcurrent protection.

The evaluation unit is advantageously integrated in a protective device for onward stator section switching and/or ground fault resistance monitoring. According to this advantageous further development of the invention, the costs of overcurrent monitoring are reduced even further.

Further expedient refinements and advantages of the invention are the subject matter of the following description of exemplary embodiments of the invention, with reference to the FIGURE of the drawing, in which:

BRIEF DESCRIPTION OF THE SEVERAL VIEWS OF THE DRAWING the FIGURE shows one exemplary embodiment of the invention, in the form of a schematic illustration.

DESCRIPTION OF THE INVENTION

The FIGURE shows one exemplary embodiment of the apparatus 1 according to the invention, which has an inverter, which is not illustrated in the FIGURE, as a power supply unit. The inverter is connected via a DC circuit to a rectifier which in turn is connected via a transformer to a feeding power supply system. The inverter, which is not shown, is connected to a plurality of power supply lines 2, which each comprise three phases, with only one phase of each power supply line being illustrated in the FIGURE, for clarity reasons.

The apparatus 1 furthermore comprises stator windings 3 which extend in switching sections 4 of an elongated stator. The stator windings 3 of each switching section 4 are connected via a section feed switch 5 to the associated power supply line 2, with a section star-point switch 7 being arranged at the star point 6 of the stator winding 3.

A feed current sensor 8a is provided between each section feed switch 5 and the stator winding 3 in order to detect a current flowing via the stator winding 3. The feed current sensor 8a is connected via a communication line 9 to an evaluation unit 10, which samples the calibrated current signals, which are transmitted by the feed current sensor and are proportional to the current flowing in the stator winding, resulting in sample values being obtained, and then digitizes the sample values in order to obtain digital current values. In contrast to this, the current sensor is connected, as an analog value sensor, directly to the evaluation unit. The digital current values are compared with a predetermined configured threshold value by means of logic which is stored in the evaluation unit 10. If the digital current values exceed the threshold value, the evaluation unit 10 causes the section feed switch 5 to be opened, as a result of which the stator winding 3 is disconnected from the power supply of the power supply line 2.

In order to ensure the switching-off process takes place as reliably as possible, a star-point current sensor 11a, which interacts with a further evaluation unit 12, is provided at the star-point 6 of the stator winding 3, with the evaluation unit 12 being designed to trip the section star-point switch 7. The evaluation unit 12 is designed in a corresponding manner to the evaluation unit 10 and compares the current measured values obtained from the signals from the star-point current sensor with a configured threshold value, such that, if the threshold value is exceeded, this leads to the stator winding 3 being switched off by the section star-point switch 7. At this point, it should be noted that the evaluation units 10 and 12 may also be arranged in a common computation device.

FIG. 1 shows a further option for redundant overcurrent protection. It is therefore possible within the scope of the invention, for example, to arrange a further section star-point switch 11b on the star point 6 of each stator winding 3, which section star-point switch 11b is connected to a further evaluation unit 13, with the evaluation unit 13 being connected to the feed current sensor 8a of a physically subsequent stator winding 3. The evaluation unit 12, which has already been described and is connected to the star-point current sensor 11a is, furthermore, connected to a further current sensor, specifically the feed current sensor 8b of the physically subsequent stator winding 3. In this case, the evaluation units 12 and 13 are respectively designed not only to switch the section star-point switch 7 but also section feed switch 5 of the physically subsequent stator winding 3. This means that each evaluation unit 12 or 13 is able to initiate the process of switching off the faulty stator winding 3, depending on the stator winding 3 in which an overcurrent is found. This redundant design improves the overcurrent protection even further.

The invention claimed is:

1. An apparatus for driving a magnetic levitation rail road, comprising:
    at least one controllable power supply unit configured for feeding at least one polyphase power supply line;
    a long stator having stator windings extending in switching sections of said long stator;
    section feed switches for connecting each said switching section to at least one of said power supply lines;
    at least one current sensor associated with each said stator winding for detection of a current in one phase of the respectively associated said stator winding; and
    at least one evaluation unit connected to said current sensor and configured to switch off the respective said section feed switch if the respectively detected current exceeds a previously defined threshold value.

2. The apparatus according to claim 1, wherein said current sensors comprise feed current sensors disposed in an immediate vicinity of said section feed switches.

3. The apparatus according to claim 1, wherein said current sensors comprise star-point current sensors disposed in an immediate vicinity of a star point of the respectively associated said stator winding.

4. The apparatus according to claim 1, which further comprises section star-point switches disposed at a star point of said stator winding.

5. The apparatus according to claim 4, wherein a first evaluation unit is configured to trip said section feed switch, and a second evaluation unit is configured to trip said section star-point switch.

6. The apparatus according to claim 5, wherein said second evaluation unit is configured to trip said section feed switch of a subsequent switching section.

7. The apparatus according to claim 5, wherein said first evaluation unit of a subsequent switching section is configured to trip said section star-point switch of a preceding switching section.

8. The apparatus according to claim 1, wherein said evaluation unit is integrated in a protective device for onward stator section switching and ground fault resistance monitoring.

9. The apparatus according to claim 1, wherein said evaluation unit is integrated in a protective device for onward stator section switching or ground fault resistance monitoring.

* * * * *